(12) United States Patent
Arankalle et al.

(10) Patent No.: US 8,661,464 B2
(45) Date of Patent: Feb. 25, 2014

(54) TARGETING IN-VIDEO ADVERTISING

(75) Inventors: Poorva Arankalle, Redmond, WA (US); Brienne M. Finger, Bellevue, WA (US); Lin Liao, Bothell, WA (US); Manish Gupta, Santa Clara, CA (US); Rajas Moonka, San Ramon, CA (US); Reuven Lax, Seattle, WA (US); Jill A. Huchital, Saratoga, CA (US)

(73) Assignee: Google Inc., Mountain View, CA (US)

( * ) Notice: Subject to any disclaimer, the term of this patent is extended or adjusted under 35 U.S.C. 154(b) by 901 days.

(21) Appl. No.: 11/770,585

(22) Filed: Jun. 28, 2007

(65) Prior Publication Data
US 2009/0006191 A1 Jan. 1, 2009

Related U.S. Application Data

(60) Provisional application No. 60/946,717, filed on Jun. 27, 2007.

(51) Int. Cl.
*H04N 7/10* (2006.01)
*G06Q 30/00* (2012.01)

(52) U.S. Cl.
USPC ............... 725/32; 705/14.41; 725/34; 725/36

(58) Field of Classification Search
USPC ......... 705/14, 30–37, 14.41; 725/325, 23–26, 725/32, 34, 36
See application file for complete search history.

(56) References Cited

U.S. PATENT DOCUMENTS

| | | | |
|---|---|---|---|
| 7,085,732 B2 | 8/2006 | Gould | |
| 2002/0090198 A1 | 7/2002 | Rosenberg et al. | |
| 2002/0100042 A1 | 7/2002 | Khoo et al. | |
| 2002/0144262 A1* | 10/2002 | Plotnick et al. | 725/32 |
| 2003/0112258 A1* | 6/2003 | Dietz et al. | 345/700 |
| 2003/0149618 A1* | 8/2003 | Sender et al. | 705/14 |
| 2003/0149975 A1 | 8/2003 | Eldering et al. | |
| 2004/0030599 A1 | 2/2004 | Sie et al. | |
| 2005/0171843 A1 | 8/2005 | Brazell et al. | |
| 2006/0074752 A1 | 4/2006 | Newmark | |
| 2006/0179453 A1 | 8/2006 | Kadie et al. | |
| 2006/0212897 A1 | 9/2006 | Li et al. | |
| 2007/0055986 A1 | 3/2007 | Gilley et al. | |
| 2007/0078718 A1 | 4/2007 | Gorodyansky | |
| 2007/0162335 A1* | 7/2007 | Mekikian | 705/14 |
| 2008/0152300 A1* | 6/2008 | Knee et al. | 386/68 |

FOREIGN PATENT DOCUMENTS

WO WO0150296 A2 7/2001

OTHER PUBLICATIONS

U.S. Appl. No. 11/550,249, filed Oct. 17, 2006, Dmitriev et al.
U.S. Appl. No. 11/550,388, filed Oct. 17, 2006, Moonka et al.
U.S. Appl. No. 11/479,942, filed Jun. 30, 2006, Muthukrishnan et al.
U.S. Appl. No. 60/915,654, filed May 2, 2007, Klein et al.

(Continued)

*Primary Examiner* — Sun Li
(74) *Attorney, Agent, or Firm* — Fish & Richardson P.C.

(57) ABSTRACT

Techniques for presenting a content item with a media item are described. The techniques include receiving user input indicating a placement preference for a content item to be presented with a media item. The placement preference indicates a presentation preference of the content item relative to presentation of the media item. The placement preference is used to influence selection of a media item with which the content item is to be presented.

17 Claims, 10 Drawing Sheets

(56) References Cited

OTHER PUBLICATIONS

Lowe, D.G. *Object Recognition from Local Scale-Invariant Features*, Proceedings of the Seventh IEEE International Conference on Computer Vision, vol. 2, Sep. 1999, pp. 1150-1157 [online][retrieved on Feb. 25, 2009][retrieved from: http://www.cs.ubc.ca/~lowe/papers/iccv99.pdf] pp. 1-8.

Notification Concerning Transmittal of International Preliminary Report on Patentability, PCT/US2008/068552 dated Jan. 14, 2010, 7 pages.

"Adsense" Jun. 21, 2007, from Wikipedia, the free encyclopedia. Retrieved from the Internet: URL:http://en.wikipedia.org/w/index.php?title=AdSense&oldid=139743978 [retrieved on Apr. 9, 2013], XP055058840, 4 pages.

Berg J: "Google AdSense to Benefit YouTube", Oct. 10, 2006, XP002574898, Retrieved from the Internet: URL: http://www.imediaconnection.com/content/11634.imc [retrieved on Mar. 22, 2010] p. 1.

"YouTube Embedded Player Featuring Google Video Ads?", Jun. 8, 2007, XP055058826, Retrieved from the Internet: URL:http://www.searchenginejournal.com/new-youtube-embedded-player-features-google-video-ads/5064 [retrieved on Apr. 9, 2013], 8 pages.

Supplementary European Search Report dated Apr. 9, 2013, 2 pages.

Examiner's First Report dated Apr. 16, 2012 for AU Patent Application No. 2008268134, 7 pages.

Communicant pursuant to Article 94(3) EPC for EP Appl. No. 08 796 039.9-1958, dated May 10, 2013, 5 pages.

\* cited by examiner

TARGETING IN-VIDEO ADVERTISING

CROSS REFERENCE TO RELATED APPLICATIONS

This application claims the benefit of U.S. Provisional Application No. 60/946,717, filed on Jun. 27, 2007 and titled TARGETING IN-VIDEO ADVERTISING, which is incorporated by reference in its entirety.

TECHNICAL FIELD

This specification relates to advertising.

BACKGROUND

Online video is a growing medium. The popularity of online video services reflect this growth. Advertisers see online video as another way so reach their customers. Many advertisers are interested in maximizing the number of actions (e.g., impressions and/or click-throughs) for their advertisements. To achieve this, advertisers make efforts to target advertisements to content, such as videos, that are relevant to their advertisements.

When an advertiser wishes to target advertisements to a video, the advertiser may target advertisements to the video content. For example, if videos are classified into categories, the advertiser can target advertisements to the videos based on the categories.

In some online advertising systems, advertisers pay for their ads through an advertising auction system in which they bid on advertisement placement on a Cost-Per-Click (CPC) or a Cost-Per-Mille (e.g., thousand impressions) (CPM) basis. The advertiser typically has a budget to spend on advertising, and the auction can be run between competing advertisers via each bidder's CPC and/or CPM bid given the advertiser's budget, or through a more complex equation of CPC end CPM, such as one that weighs the advertiser's bid by that advertisement's known Click-Thru-Rate (CTR) or other values. In one variation on the system, an advertiser targets an advertisement at a particular content location, web site, or content category, and the advertiser's bid is weighted by an estimated Click Through Rate (eCTR).

SUMMARY

In one general aspect, user input indicating a placement preference for an advertisement to be presented with a video is received. The placement preference indicates a presentation preference of the advertisement relative to presentation of feature content of the video. The placement preference is used to influence selection of a video with which the advertisement is to be presented.

In one general aspect, user input indicating a placement preference for a content item to be presented with a media item is received. The placement preference indicates a presentation preference of the content item relative to presentation of the media item. The placement preference is used to influence selection of a media item with which the content item is to be presented.

Implementations may include one or more of the following feature. For example, the media item may be one or more of an audio item, a video item, and a combination of a video item and an audio item. The content item may be presented using one or more of text graphics, still-image, video, audio, banners and links. The placement preference may indicate a presentation preference of a sequence of the content item relative to the presentation of the media item. The placement preference may include one or more of pre-roll placement such that the content item is to be placed prior to playing of feature content of the media item, mid-roll placement such that the content item is to be placed within feature content of the media item, and post-roll placement such that the content item is to be placed once playing of feature content of the media item is completed. The placement preference may include placement of the content item based on whether a viewer of the media item has capability of skipping the content item.

The content item may include an advertisement. Receiving user input may include receiving a bid for placement of the advertisement that reflects placement preference of a sponsor of the advertisement. The placement preference and the bid may be used to influence selection of media with which the advertisement is to be presented.

The placement preference may include a first placement preference. User input indicating a second placement preference for the advertisement to be presented with a media item may be received. The second placement preference may indicate a second presentation preference of the advertisement relative to presentation of the media item. A first and second bids for placement of the advertisement may be received. The first and second bids may respectively reflect the first and second placement preferences of a sponsor of the advertisement. The second bid may be different from the first bid and the second placement preference may be different from the first placement preference. The first and second placement preferences and the first and second bids may be used to influence selection of a media item with which the advertisement is to be presented.

In another general aspect, user input indicating a placement preference for a content item to be presented with a media item is received. The placement preference indicates a presentation preference of the content item based on an entity presenting the media item. The placement preference is used to influence selection of a media item with which the content item is to be presented.

Implementations may include one or more of the features noted above. Implementations may also include one or more of the following features. For example, the placement preference may indicate whether fee content item is to be presented with an embedded media item. An entity presenting the embedded media item is different from an entity owning the embedded media item. The placement preference may indicate one or more entities and whether the content item may be presented with a media item presented by the one or more entities.

In yet another general aspect, a graphical user interface is generated on a display device for using a computer to specify ad placement preferences. The graphical user interface includes a placement preference region. The placement preference region includes placement preference which may be modified by a user. The placement preference indicates a presentation preference of an advertisement relative to presentation of feature content. Implementations may include one or more of the features noted above.

In a further general aspect, a graphical user interface is generated on a display device for using a computer to specify ad placement preferences. The graphical user interface includes a placement preference region. The placement preference region includes placement preference which may be modified by a user. The placement preference indicates a presentation preference of an advertisement based on an entity presenting a media item. Implementations may include one or more of the features noted above.

The details of one or more implementations are set forth in the accompanying drawings and the description below. Other features and advantages will be apparent from the description and drawings as well as from the claims.

DETAILED DESCRIPTION

Figure 1:
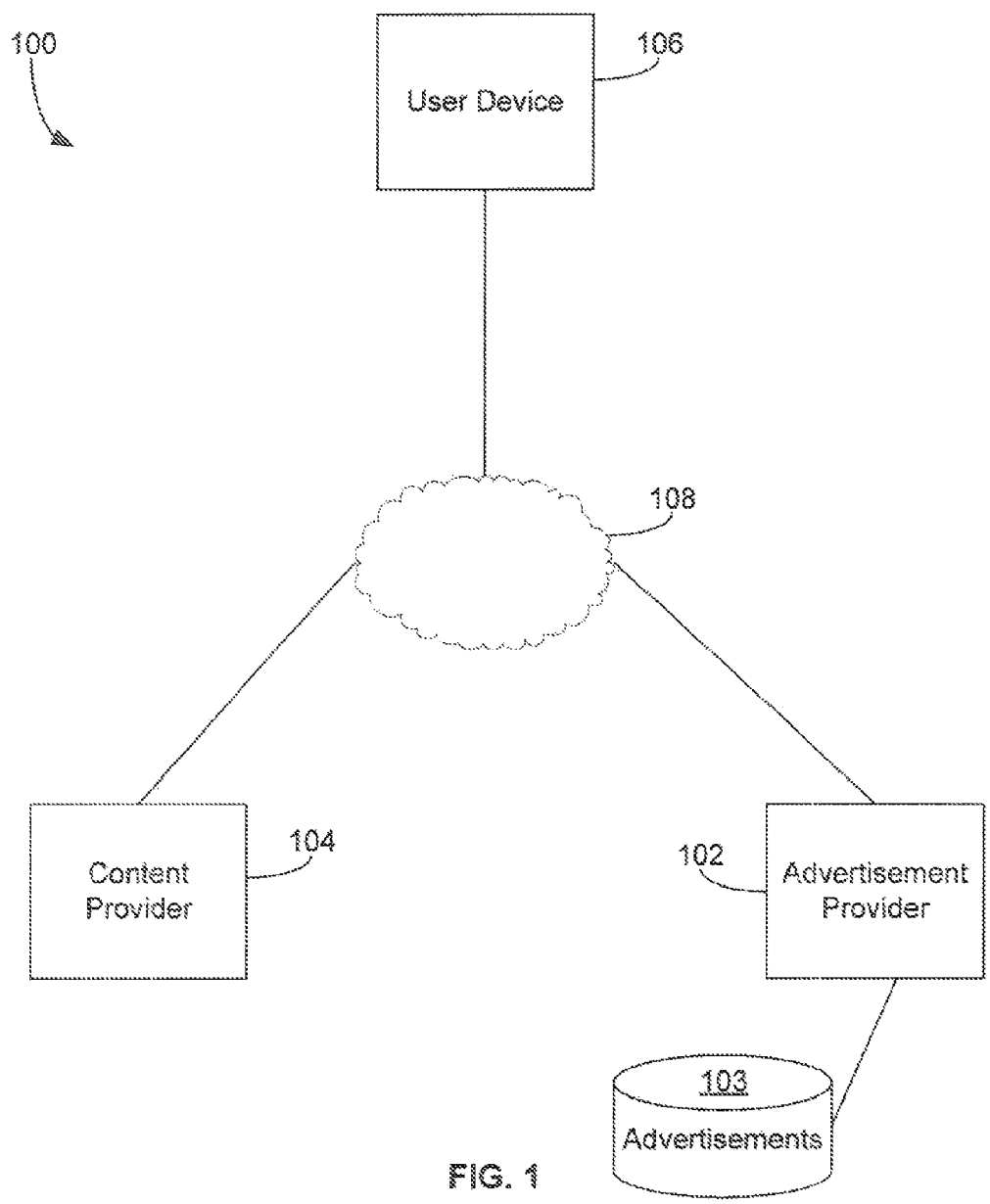
FIG. 1 illustrates an example of an environment for providing content.

FIG. 1 shows an example of an environment 100 for providing content. The content, or "content items," can include various forms of electronic media. For example, the content can include text, audio, video, advertisements, configuration parameters, documents, video files published on the Internet, television programs, podcasts, video podcasts, live or recorded talk shows, video voicemail, segments of a video conversation, and other distributable resources.

The environment 100 includes, or is communicably coupled with, an advertisement provider 102, a content provider 104, and one or more user devices 106, at least some of which communicate across network 108. In general, the advertisement provider 102 can characterize presented content and provide relevant advertising content ("ad content") or other relevant content. By way of example, reference is made to delivering ad content, though other forms of content (e.g., other content item types) can be delivered. The presented content may be provided by the content provider 104 through the network 108. The ad content may be distributed, through network 108, to one or more user devices 106 before, during, or after presentation of the material. In some implementations, advertisement provider 102 may be coupled with an advertising repository 103. The ad repository stores advertising that can be presented with various types of content, including audio and/or video content.

Is some implementations, the environment 100 may be used to identify relevant advertising content according to a particular selection of a video or audio content item (e.g., one or more segments of video or audio). For example, the advertisement provider 102 can acquire knowledge about scenes in a video content item, such as content changes in the audio and video data of the video content item. The knowledge can be used to determine targeting criteria for the video content item, which in turn can be used to select relevant advertisements for appropriate places in the video content item. In some implementations, the relevant advertisements can be placed in proximity to or overlaid with the presented content item, such as in a banner, sidebar, or frame.

The selection of advertisements for placement in the video content item is determined based on a placement preference of, for example, an advertiser. The placement preference indicates a presentation preference of an advertisement relative to the presentation of the video content item. For example, a placement preference may include placement of an advertisement relative to video feature content, such as targeting (or excluding) one or more of pre-roll placement, mid-roll placement or post-roll placement. The pre-roll placement or pre-roll advertising (also called pre-watch advertising) refers to advertising presented before the video feature plays. This may be accomplished, for example, by superimposing pixels corresponding to the advertising content over the video playback area of the video player before the video feature begins. The pre-roll advertising may be presented as an opaque display. The pre-roll advertising may be presented so as to allow the viewer to see both the advertising portion and the underlying video feature that is covered by the advertising. The mid-roll placement or mid-roll advertising (also called mid-watch advertising or interstitial advertising) refers to advertising presented while the video feature content has begun or is playing. The post-roll placement or post-roll advertising (also called post-watch advertising) refers to advertising presented after the video feature has finished playing.

The placement preference may also include placement of an advertisement based on whether the viewer has the capability of skipping advertisements, excluding placement of an advertisement in an embedded video, or excluding placement of an advertisement in video presented by web sites identified by the advertiser.

In some implementations, advertisers may identify preferences for an advertisement or group of advertisements by entering or adjusting bids used to place advertisements in videos where the bids reflect the advertisers placement preferences.

In some implementations, the selection of advertisements for placement in a video content item is determined based on a placement preference and a bid of an advertiser. For each placement preference of an advertisement, the advertiser may offer a bid for placement of the advertisement. Among the advertisements having a matching placement preference with a video content item, the advertisement(s) with the highest bid may be presented in the video feature content as specified by the placement preference.

In some implementations, a "video content item" is an item of content that includes content that can be perceived visually when played, rendered, or decoded. A video content item includes video data, and optionally audio data and metadata. Video data includes content in the video content item that can be perceived visually when the video content item is played, rendered, or decoded. Audio data includes content in the video content item that can be perceived aurally when the video content item is played, decoded, or rendered. A video content item may include video data and any accompanying audio data regardless of whether or not the video content item is ultimately stored on a tangible medium. A video contest item may include, for example, a live or recorded television program, a live or recorded theatrical or dramatic work, a music video, a televised event (e.g., a sports event, a political event, a news event, etc.), video voicemail etc. Each of different forms or formats of the same video data and accompanying audio data (e.g., original, compressed, packetized, streamed, etc.) may be considered to be a video content item (e.g., the same video content item, or different video content items).

Video content can be consumed at various client locations, using various devices. Examples of the various devices include customer premises equipment which is used at a residence or place of business (e.g., computers, video players, video-capable game consoles, televisions or television set-top boxes, etc.), a mobile telephone with video functionality, a video player, a laptop computer, a set top box, a game console, a car video player, etc. Video content may be transmitted from various sources including, for example, terrestrial television (or data) transmission stations, cable television (or data) transmission stations, satellite television (or data) transmission stations, via satellites, and video content servers (e.g., Webcasting servers, podcasting servers, video streaming servers, video download Websites, etc.), via a network such as the Internet for example, and a video phone service provider network such as the Public Switched Telephone Network ("PSTN") and the Internet, for example.

A video contest item can also include many types of associated data. Examples of types of associated data include video data, audio data, closed-caption or subtitle data, a transcript, content descriptions (e.g., title, actor list, genre information, first performance or release date, etc.), related still images, user-supplied tags and ratings, etc. Some of this data, such as the description, can refer to the entire video content item, while other data (e.g., the closed-caption data) may be temporally-based or timecoded. In some implementations, the temporally-based data may be used to detect scene or content changes to determine relevant portions of that data for targeting ad content to users.

In some implementations, an "audio content item" is an item of content that can be perceived aurally when played, rendered, or decoded. An audio content item includes audio data and optionally metadata. The audio data includes content in the audio content item that can be perceived aurally when the video content item is played, decoded, or rendered. An audio content item may include audio data regardless of whether or not the audio content item is ultimately stored on a tangible medium. An audio content item may include, for example, a live or recorded radio program, a live or recorded theatrical or dramatic work, a musical performance, a sound recording, a televised event (e.g., a sports event, a political event, a news event, etc.), voicemail, etc. Each of different forms or formats of the audio data (e.g., original, compressed, packetized, streamed, etc.) may be considered to be an audio content item (e.g., the same audio content item, or different audio content items).

Audio content can be consumed at various client locations, using various devices. Examples of the various devices include customer premises equipment which is used at a residence or place of business (e.g., computers, audio players, audio-capable game consoles, televisions or television set-top boxes, etc.), a mobile telephone with audio playback functionality, an audio player, a laptop computer, a car audio player, etc. Audio content may be transmitted from various sources including, for example, terrestrial radio (or data) transmission stations, via satellites, and audio content servers (e.g., Webcasting servers, podcasting servers, audio streaming servers, audio download Websites, etc.), via a network such as the Internet for example, and a video phone service provider network such as the Public Switched Telephone Network ("PSTN") and the Internet, for example.

An audio content item can also include many types of associated data. Examples of types of associated data include audio data, a transcript, content descriptions (e.g., title, actor list, genre information, first performance or release date, etc.), related album cover image, user-supplied tags and ratings, etc. Some of this data, such as the description, can refer to the entire audio content item, while other data (e.g., the transcript data) may be temporally-based. In some implementations, the temporally-based data may be used to detect scene or content changes to determine relevant portions of that data for targeting ad content to users.

Ad content can include text, graphics, still-images, video, audio, audio and video, banners, links (such as advertising providing a hyperlink to an advertiser's website), and other web or television programming related data. As such, ad content can be formatted differently, based on whether the ad content is primarily directed to websites, media players, email, television programs, closed captioning, etc. For example, ad content directed to a website may be formatted for display in a frame within a web browser. In other examples, ad content may be delivered in an RSS (Real Simple Syndication) feed, or ad content may be delivered relative to a radio item (such as before, during or after a radio stem). As yet another example, ad content directed to a video player may be presented "in-stream" as video content is played in the video player. In some implementations, in-stream ad content may replace the video or audio content in a video or audio player for some period of time or may be inserted between portions of the video or audio content. An in-stream advertisement can be placed pre-roll, post-roll, or mid-roll relative to video feature content. An in-stream advertisement may include video, audio, text, animated images, still images, or some combination thereof.

The content provider 104 can present content to users (e.g., user device 106) through the network 108. In some implementations, the content providers 104 are web servers where the content includes webpages or other content written in the Hypertext Markup Language (HTML), or any language suitable for authoring webpages. In general, content provider 104 can include users, web publishers, and other entities capable of distributing content over a network. For example, a web publisher may create an MP3 audio file and post the file on a publicly available web server. In some implementations, the content provider 104 may make the content accessible through a known Uniform Resource Locator (URL).

The content provider 104 can receive requests for content (e.g., articles, discussion threads, music, audio, video, graphics, search results, webpage listings, etc.). The content provider 104 can retrieve the requested content in response to, or otherwise service, the request. The advertisement provider 102 may broadcast content as well (e.g., not necessarily responsive to a request).

A request for advertisements (or "ad request") may be submitted to the advertisement provider 102. Such an ad request may include ad spot information (e.g., a number of advertisements desired, a duration, type of ads eligible, etc.). In some implementations, the ad request may also include information about the content item that triggered the request for the advertisements. This information may include the content item itself (e.g., a page, a video file, a segment of an audio stream, data associated with the video or audio file, etc.), one or more categories or topics corresponding to the content item or the content request (e.g., arts, business, computers, arts-movies, arts-music, etc.), part or all of the content request, content age, content type (e.g., text, graphics, video, audio, mixed media, etc.), geo-location information, etc.

In some implementations, the information in the ad request submitted by advertisement provider 102 may indicate characteristics of a video content item that triggered the request for the advertisements. Such characteristics may be used to determine advertisements having a matching placement preference. For example, the ad request may indicate whether the video content item allows pre-roll placement of ads, mid-roll placement or post-roll placement. Alternatively or additionally, the ad request may indicate whether a viewer has capability of skipping advertisements. Then, advertisements with matching placement preference may be selected to be presented in the video content item. For example, a video content may allow only post-roll placement of advertisements (e.g., the advertisements may be presented only after the video content has finished playing) and may not allow a viewer to skip advertisements. Then, those ads with the matching placement preference may be selected and placed relative to video content based on the placement preference (e.g., pre-roll, mid-roll and/or post-roll).

Content provided by content provider 104 can include news, weather, entertainment, or other consumable textual, audio, or video media. More particularly, the content can include various resources, such as documents (e.g., webpages, plain text documents, Portable Document Format (PDF) documents, images), video or audio clips, etc. In some implementations, the content can be graphic-intensive, media-rich data, such as, for example, Flash-based content that presents video and sound media.

The environment 100 includes one or more user devices 106. The user device 106 can include a desktop computer, laptop computer, a media player (e.g., an MP3 player, a streaming audio player, a streaming video player, a television, a computer, a mobile device, etc.), a mobile phone, a browser facility (e.g, a web browser application), an e-mail facility, telephony means, a set top box, a television device, a radio device or other device that can access advertisements and other content via network 108. The content provider 104 may permit user device 106 to access content (e.g., video files for downloading or streaming, audio files for downloading or streaming, etc.).

The network 108 facilitates wireless or wireline communication between the advertisement provider 102, the content provider 104, and any other local or remote computers (e.g., user device 106). The network 108 may be all or a portion of an enterprise or secured network. In another example, the network 108 may be a virtual private network (VPN) between the content provider 104 and the user device 106 across a wireline or a wireless link. While illustrated as a single or continuous network, the network 108 may be logically divided into various sub-nets or virtual networks without departing from the scope of this disclosure, so long as at least a portion of the network 108 may facilitate communications between the advertisement provider 102, content provider 104, and at least one client (e.g., user device 106). In certain implementations, the network 108 may be a secure network associated with the enterprise and certain local or remote clients 106.

Examples of network 108 include a local area network (LAN), a wide area network (WAN), a wireless phone network, a Wi-Fi network, and the Internet.

In some implementations, a content item is combined with one or more of the advertisements provided by the advertisement provider 102. This combined information including the content of the content item and advertisement(s) is then forwarded toward a user device 106 that requested the content item or that configured itself to receive the content item, for presentation to a user.

The content provider 104 may transmit information about the ads and how, when, and/or where the ads are to be rendered, and/or information about the results of that rendering (e.g., ad spot, specified, segment, position, selection or not, impression time, impression date, size, temporal length, volume, conversion or not, etc.) back to the advertisement provider 102 through the network 108. Alternatively, or in addition, such information may be provided back to the advertisement provider 102 by some other means.

In some implementations, the content provider 104 includes advertisement media as well as other content. In such a case, the advertisement provider 102 can determine and inform the content provider 104 which advertisements to send to the user device 106, for example.

Figure 2:
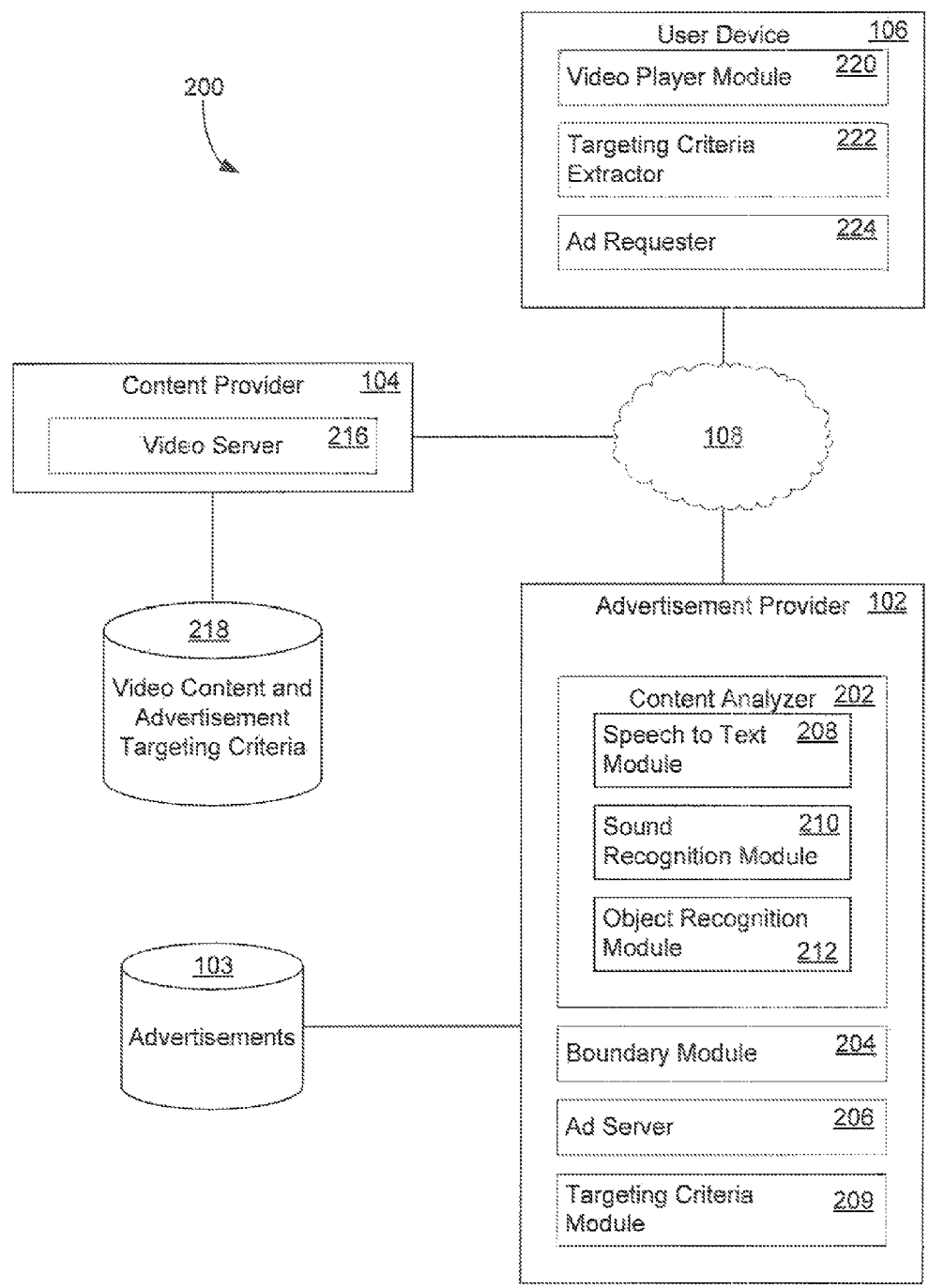
FIG. 2 is a block diagram illustrating an example environment in which electronic promotional material (e.g., advertising content) may be identified according to targeting criteria.

FIG. 2 is a block diagram illustrating an example environment 200 in which electronic promotional material (e.g., advertising content or advertisements) may be identified according to targeting criteria. Environment 200 includes, or is communicatively coupled with advertisement provider 102, content provider 104, and user device 106, at least some of which communicate across network 108.

In some implementations, the advertisement provider 102 includes a content analyzer 202, a boundary module 204, and an ad server 206. The content analyzer 202 may examine received content items to determine segmentation boundaries and/or targeting criteria for content items. For example, the content analyzer 202 may implement various analysis methods, including, but not limited to weighting schemes, speech processing, image or object recognition, and statistical methods.

The analysis methods can be applied to the contextual elements of the received content item (e.g., video content, audio content, etc.) to determine boundaries for segmenting the received content and to determine relevant targeting criteria. For example, the received content may undergo one or more of audio volume normalization, automatic speech recognition, transcoding, indexing, image recognition, sound recognition, etc. In some implementations, the content analyzer 202 includes a speech to text module 208, a sound recognition module 210, and an object recognition module 212. Other modules are possible.

The speech to text module 208 can analyze content received in environment 200 to identify speech in the content. For example, a video content item may be received in the environment 200. The speech-to-text module 208 can analyze the video content item as a whole. Textual information may be derived from the speed included in the audio data of the video content item by performing speech recognition on the audio content, producing in some implementations hypothesized words annotated with confidence scores, or in other implementations a lattice which contains many hypotheses. Examples of speech recognition techniques include techniques based on hidden Markov models, dynamic programming, or neural networks.

In some implementations, the speech analysis may include identifying phonemes, converting the phonemes to text, interpreting the phonemes as words or word combinations, and providing a representation of the words, and/or word combinations, which best corresponds with the received input speech (e.g., speech in the audio data of a video content item). The text can be further processed to determine the subject matter of the video content item. For example, keyword spotting (e.g., word or utterance recognition), pattern recognition (e.g., defining noise ratios, sound lengths, etc.), or structural pattern recognition (e.g., syntactic patterns, grammar, graphical patterns, etc.) may be used to determine the subject matter, including different segments, of the video content item. The identified subject matter in the video content item content can be used to identify boundaries for dividing the video content item into segments and to identity relevant targeting criteria. In some implementations, further processing may be carried out on the video content item to refine the identification of subject matter in the video content item.

A video content item can also include timecoded metadata. Examples of timecoded metadata include closed-captions, subtitles, or transcript data that includes a textual representation of the speech or dialogue in the video or audio content item. In some implementations, a caption data module at the advertisement provider 102 (not shown) extracts the textual representation from the closed-caption, subtitle, or transcript data of the content item and used the extracted text to identify subject matter in the video content item. The extracted text can be a supplement to or a substitute for application of speech recognition on the audio data of the video content item.

Further processing may include sound recognition techniques performed by the sound recognition module 210. Accordingly, the sound recognition module 210 may use sound recognition techniques to analyze the audio data. Understanding the audio data may enable the environment 200 to identify the subject matter in the audio data and to identify likely boundaries for segmenting the content item. For example, the sound recognition module 210 may recognize abrupt changes in the audio or periods of silence in the video, which may be indicia of segment boundaries.

Further processing of received content can also include object recognition. For example, automatic object recognition can be applied to received or acquired video data of a video content item to determine targeting criteria for one or more objects associated with the video content item. For example, the object recognition module 212 may automatically extract still frames from a video content item for analysis. The analysis may identify targeting criteria relevant to objects identified by the analysis. The analysis may also identify changes between sequential frames of the video content item that may be indicia of different scenes (e.g., fading to black). If the content item is an audio content item, then object recognition analysis is not applicable (because there is no video content to analyze). Examples of object recognition techniques include appearance-based object recognition, and object recognition based on local features, an example of which is disclosed in Lowe, "Object Recognition from Local Scale-Invariant Features," Proceedings of the Seventh IEEE International Conference on Computer Vision, Volume 2, pp. 1150-1157 (September 1999), which is incorporated by reference in its entirety.

Advertisement provider 102 includes a boundary module 204. The boundary module 204 may be used in conjunction with the content analyzer 202 to place boundaries in the content received at the advertisement provider 102. The boundaries may be placed in text, video, graphical, or audio data based on previously received content. For example, a content item may be received as a whole and the boundaries may be applied based on the subject matter in the textual audio, or video content. In some implementations, the boundary module 204 may simply be used to interpret existing boundary settings for a particular selection of content (e.g., a previously aired television program). In some implementations, the boundary data are stored separately from the content item (e.g., in a separate text file).

Advertisement provider 102 includes a targeting criteria module 209. The targeting criteria module 209 may be used in conjunction with the content analyzer 202 to identify targeting criteria for content received at the advertisement provider 102. The targeting criteria can include keywords, topics, concepts, categories, and the like.

In some implementations, the information obtained from analyses of a video content item performed by the content analyzer 202 can be used by both the boundary module 204 and the targeting criteria module 209. Boundary module 204 can use the information (e.g., recognized differences between frames, text of speech in the video content item, etc.) to identify multiple scenes in the video content item and the boundaries between the scenes. The boundaries segment the video content item into segments, for which the targeting criteria module 209 can use the same information to identify targeting criteria.

Advertisement provider 102 also includes an ad server 206. Ad server 206 may directly, or indirectly, enter, maintain, and track advertisement information. The ads may be in the form of graphical ads such as so-called banner ads, text only ads, image ads, audio ads, video ads, ads combining one of more of any of such components, etc. The ads may also include embedded information, such as a link, and/or machine executable instructions. User devices 106 may submit requests for ads to, accept ads responsive to their request from, and provide usage information to, the ad server 206. An entity other than a user device 106 may initiate a request for ads. Although not shown, other entities may provide usage information (e.g., whether or not a conversion or selection related to the advertisement occurred) to the ad server 206. For example, this usage information may include measured or observed user behavior related to ads that have been served.

The ad server 206 may include information concerning accounts, campaigns, creatives, targeting, etc. The term "account" relates to information for a given advertiser (e.g., a unique email address, a password, billing information, etc.). A "campaign," "advertising campaign," or "ad campaign" refers to one or more groups of one or more advertisements, and may include a start date, an end date, budget information, targeting information, syndication information, etc.

In some implementations, the advertisement provider 102 may receive content from the content provider 104. The techniques and methods discussed in the above description may be applied to the received content. The advertisement provider 102 can then provide advertising content to the content provider 104 that corresponds to the received/analyzed content.

In some implementations, the selection of advertisements for placement in the received/analyzed video content may be determined based on a placement preference determined by, for example, an advertiser. The placement preference indicates a presentation preference of an advertisement relative to the presentation of the video feature content. The advertiser may modify the placement preference for an advertisement to influence the selection of a video content item in which the advertisement is to be presented. The ad server 206 may provide a user interface for the advertiser to enter and modify the place preference for an advertisement.

The placement preference for an advertisement may include characteristics of a video content item in which the advertisement is to appear. For example, a placement preference may include placement of an advertisement relative to video feature content, such as targeting (or excluding) one or more of pre-roll placement, mid-roll placement or post-roll placement. The placement preference may also include placement of an advertisement based on whether the viewer has the capability of skipping advertisements, excluding placement of an advertisement in an embedded video, or excluding placement of an advertisement in video presented by web sites identified by the advertiser.

The advertisement provider 102 may use one or more advertisement repositories 214 for selecting ads for presentation to a user or other advertisement providers. The repositories 214 may include any memory or database module and may take the form of volatile or non-volatile memory including, without limitation, magnetic media, optical media, random access memory (RAM), read-only memory (ROM), removable media, or any other suitable local or remote memory component.

The content provider 104 includes a video server 216. The video server 216 may be thought of, generally, as a content server in which the content served is simply a video content item, such as a video stream or a video file for example. Further, video player applications may be used to render video files. Ads may be served in association with video content items. For example, one or more ads may be served before, during, or after a music video, program, program segment, etc. Alternatively, one or more ads may be served in association with a music video, program, program segment, etc. In implementations where audio-only content items can be provided, the video server 216 can be an audio server instead, or more generally, a content server can serve video content items and audio content items.

The content provider 104 may have access to various content repositories. For example, the video content and advertisement targeting criteria repository 218 may include available video content items (e.g., video content items for a particular website) and their corresponding targeting criteria. In some implementations, the advertisement provider 102 analyzes the material from the repository 218 and determines the targeting criteria for the received material. This targeting criteria can be correlated with the material in the video server 216 for future usage, for example. In some implementations, the targeting criteria for a content item in the repository is associated with a unique identifier of the content item.

In operation, the advertisement provider 102 and the content provider 104 can both provide content to a user device 106. The user device 106 is one example of an advertisement consumer. The user device 106 may include a user device such as a media player (e.g., an MP3 player, a streaming audio player, a streaming video player, a television, a computer, a mobile device, etc.), a browser facility, an e-mail facility, telephony means, etc.

As shown in FIG. 2, the user device 106 includes a video player module 220, a targeting criteria extractor 222, and an ad requester 224. The video player module 220 can execute documents received in the system 106. For example, the video player module 220 can play back video files or streams. In some implementations, the video player module 220 is a multimedia player module that can play back video files or streams and audio files or streams.

In some implementations, when the user device 106 receives content from the content provider (e.g., video, audio, textual, content), the targeting criteria extractor 222 can receive corresponding metadata. The metadata includes targeting criteria. The targeting criteria extractor 222 extracts the targeting criteria from the received metadata. In some implementations, the targeting criteria extractor 222 can be a part of the ad requester 224. In this example, the ad requestor 224 extracts the targeting criteria form the metadata. The extracted targeted criteria can be combined with targeting criteria derived from other sources (e.g., web browser type, user profile, etc.), if any, and one or more advertisement requests can be generated based on the targeting criteria.

In some other implementations, the metadata, which includes targeting criteria, is received by the user device. A script for sending a request can be run by the ad requester 224. The script operates to send a request using the received targeting criteria, without necessarily extracting the targeting criteria from the metadata.

The ad requester 224 can also simply perform the ad request using the targeting criteria information. For example, the ad requester 224 may submit a request for ads to the advertisement provider 102. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, metadata information, etc.

In some implementations, the ad request may include placement information of a video content item. The ad server 206 may use the received placement information of the video content item to determine whether the video content item satisfies a placement preference of an advertisement determined by an advertiser. For example, the placement information may indicate whether the video content item allows pre-roll placement, mid-roll placement or post-roll placement. Alternatively or additionally, the placement information may indicate whether the video content item allows a viewer to skip advertisements.

In some implementations, content analyzer 202, boundary module 204, and targeting criteria module 209 can be included in the content provider 104. That is, the analysis of content items and determination of boundaries and targeting criteria can take place at the content provider 104.

Although the foregoing examples described servers as (i) requesting ads, and (ii) combining them with content, one or both of these operations may be performed by a user device (e.g., an end user computer, for example).

Figure 3:
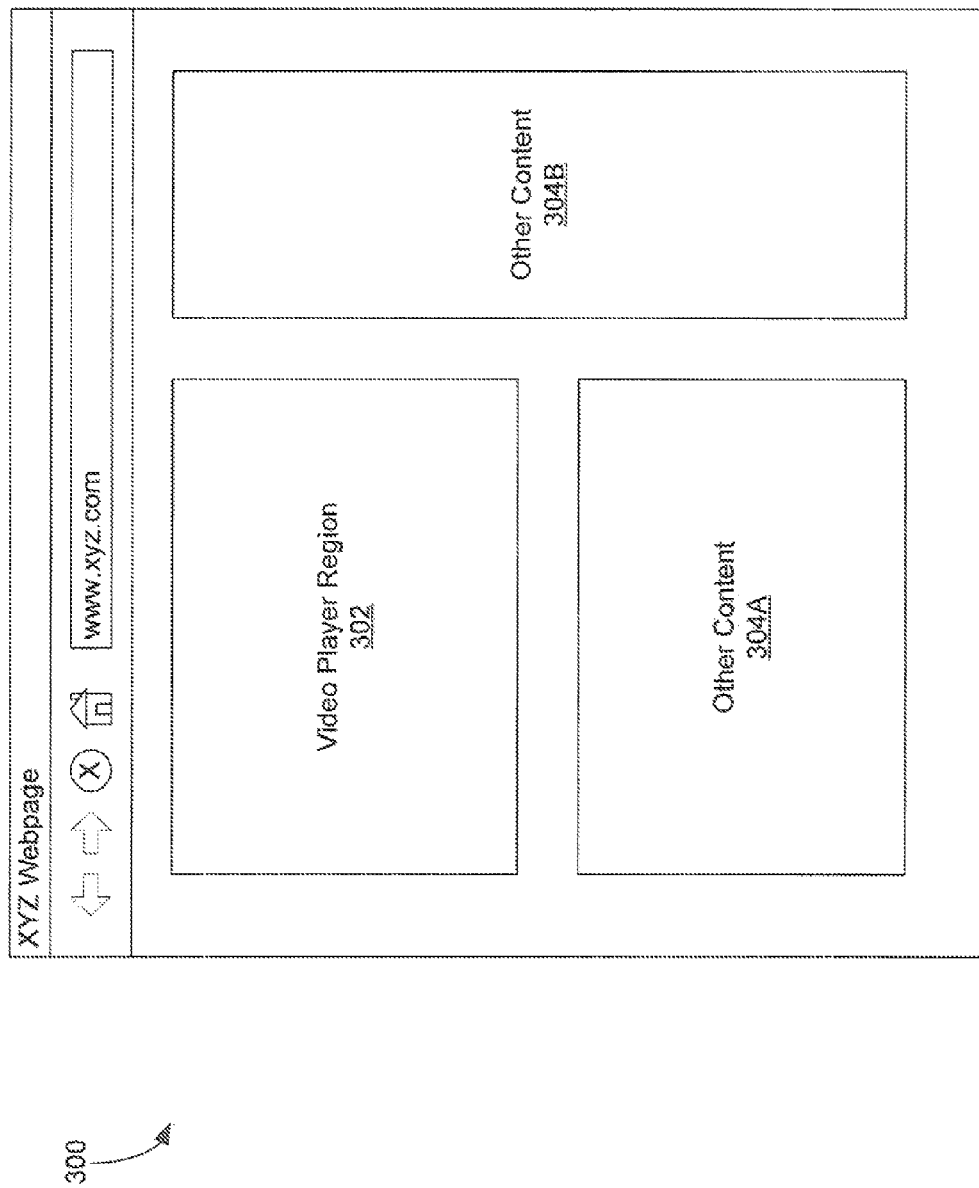
FIGS. 3 and 4 are examples of a user interface illustrating advertising content displayed on a screen with video content.

FIG. 3 is an example user interface 300 illustrating advertising content displayed on a screen with video content. The user interface 300 illustrates an example web browser user interface. However, the content shown in the user interface 300 can be presented in a webpage, an MP3 player, a streaming audio player, a streaming video player, a television, a computer, a mobile device, etc. The content shown in the user interface 300 may be provided by advertisement provider 102, content provider 104, another networked device, or some combination of those providers.

As shown, the user interface 300 includes a video player region 302 and one or more "other content" regions 304A and 304B. The video display region 302 may include a media player for presenting text, images, video, or audio, or any combination thereof. An example of what can be shown in the video display region 302 is described in further detail below in relation to FIG. 4.

The other content regions 304A and 304B may display links, third party add-ins (e.g., search controls, download buttons, etc.), video and audio cups (e.g., graphics), help instructions (e.g., text, html, pop-up controls, etc.), and advertisements (e.g., banner ads, flash-based video/audio ads, scrolling ads, etc.).

The other content may be related to the content displayed in the video player region 302. For example, boundaries, targeting criteria, and other metadata related to the video player content may have been used to determine the other content displayed in one of the other content regions 304A and 304B. In some implementations, the other content is not related to the content in the video player region 302.

The other content regions 304A and 304B may be in proximity to the video player region 302 during the presentation of video or audio content in the region 302. For example, the other content regions 304A and 304B can be adjacent to the video display region 302, either above, below, or to the side of the video display region 302. For example, the user interface 300 may include an add-on, such as a stock ticker with text advisements. The stock ticker can be presented in one of the other content regions 304A and 304.

Figure 4:
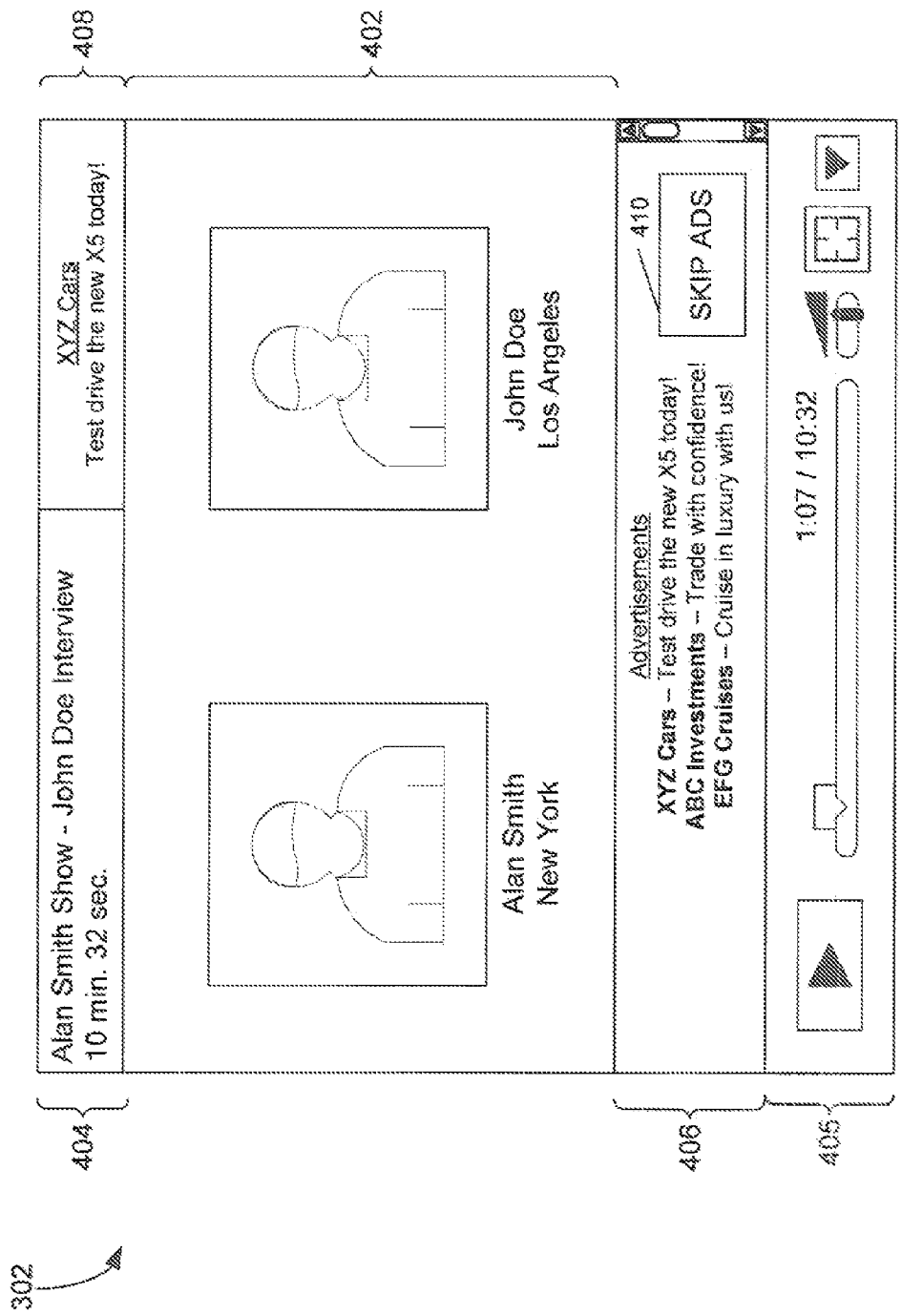

FIG. 4 illustrates an example user interface that can be displayed in a video player, such as in video player region 302. Content items, such as video, audio, and so forth can be displayed in the video player region 302. The region 302 includes a content display portion 402 for displaying a content item, a portion 404 for displaying information (e.g., title, running time, etc.) about the content item, player controls 405 (e.g., volume adjustment, full-screen mode, play/pause button, progress bar and slider, option menu, etc.), an advertisement display portion 408, and a multi-purpose portion 406 that can be used to display various content (e.g., advertisements, closed-captions/subtitles/transcript of the content item, related links, etc.).

As shown, the content shown represents a video (of audio) interview occurring between a person located in New York City, New York and a person located in Los Angeles, Calif. The interview is displayed in the content display portion 402 of the region 302.

The region 302 may be presented as a stream, upon visiting a particular site presenting the interview, or after the execution of a downloaded file containing the interview or a link to the interview. As such, the region 302 may display additional content (e.g., advertisement content) that relates to the content shown in the video interview. For example, the additional content may change according to what is displayed in the region 302. The additional content can be substantially available as content front the content provider 104 and/or the advertisement provider 102.

An on-screen advertisement is displayed in the multi-purpose portion 406. An additional on-screen advertisement is displayed in the advertisement display portion 408. In some implementations, on-screen advertisements may include text-and-audio, video, text, animated images, still images, or some combination thereof.

In some implementations, the content display portion 402 can display advertisements targeted to audio-only content, such as ads capable of being displayed in-stream with a podcast or web monitored radio broadcasts. For example, the advertisement provider 102 may provide interstitial advertisements, sound bytes, or news information in the audio stream of music or disc jockey conversations.

Advertisements may be presented on the content display portion 402. Temporal placement of advertisements relative to a video content item may vary. For example, an advertisement presentation may be pre-roll, mid-roll or post-roll placement.

In some implementations, the progress bar in the player controls 405 also shows the positions of the advertisement slots in the content item being played.

The multi-purpose portion 406 may also include a skip advertisement link or control 410. When the skip advertisement link 410 is selected by the user, the currently displayed video advertisement is skipped and playback continues from the first frame of the video after the skipped video advertisement (or, playback stops if the skipped video advertisement is located at the end of the video). In some implementations, the skip advertisement link or control 410 is a link. In some other implementations, the skip advertisement link or control 410 may be a button, selectable icon, or some other user-selectable user interface object. As described previously with respect to FIGS. 1 and 2, the ability of a user to skip advertisements, for example, by using the skip advertisement link or control 410, may effect the selection of an advertisement to be presented by the ad server 206.

Figure 5:
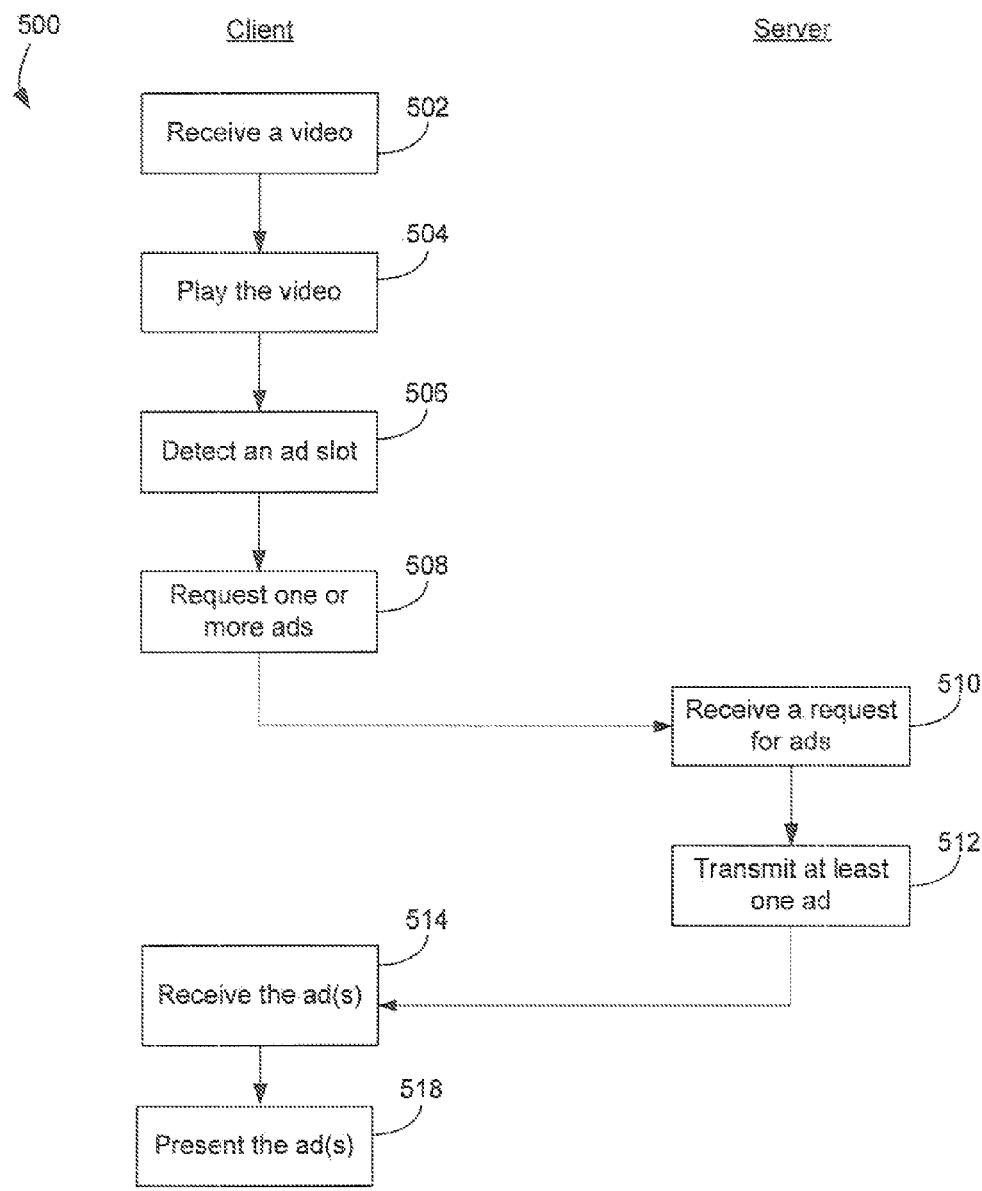
FIG. 5 is a flow diagram of an example process flow for providing video advertisements.

FIG. 5 is an example flow diagram of a process flow 500 for providing video advisements. A video is received by a client (502), which, for example, may be an implementation of a user device 106 of FIGS. 1 and 2. In some implementations, after the client sends a request for the video to the publisher, a video is received by a client from the publisher, which, for example, may be an implementation of the content provider 104 of FIGS. 1 and 2. The request may be sent by the client, in response to the client attempting to access the video. For example, the client may have loaded, at a user's command, a web page within a web browser application, where the web page has an embedded video, referred by its URL.

The video is played (504). The video may be played in a standalone video player module or in an embedded player module/plug-in. In an exemplary implementation, the video is played in a video player user interface in a web page, such as that described above with relation to FIGS. 3 and 4. In some implementations, the video begins playing after the entire video is downloaded into memory (volatile and/or non-volatile) at the client. In some other implementations, the video is streamed to the client.

During the playback of the video, an impending advertisement slot in the video is detected (506). Detecting locations for insertions of advertisements in a video stream may be accomplished using the technology, fur example, described in U.S. patent application Ser. No. 11/738,292, for "Media Advertising," which is incorporated by reference in its entirety. One or more video advertisements are requested (508). The video advertisements are requested for placement in the detected advertisement slot and for display to the user when playback of the video reaches the advertisement slot. In some implementations, the request merely asks for one or more advertisements, without requesting for any specific advertisement. In some other implementations, the request may ask for a specific advertisement. In an exemplary implementation, the request includes an identifier of the video (e.g., a video ID), metadata associated with the video, the position of the advertisement slot, and the length of the advertisement slot.

The request is received by, for example, an ad server (510). In some implementations, the server may identify the video for which the video advertisement is placed by a video identifier (ID) included in the request. The identity of the video for the video advertisement may be used to track advertisement placements. The server may determine one or more video advertisements for placement based on any number of factors, including but not limited to the position of the advertisement slot relative to video feature content, identify of presenting websites such as represented by a URL, a domain or a sub-domain, ability to skip advertisements, whether the video content item is embedded, the length of the advertisement slot, metadata associated with the video, any categories with which the video is associated, advertisement placement preference or advertisement exclusion preference, etc.

The ad server may compare the information in an ad request from a client with placement preferences of advertisers to determine one or more advertisements for placement. For example, the ad request may indicate that the video allows an advertisement to be presented only after the feature content of the video has finished playing. Based on this information, the ad server identifies advertisements for which placement preferences of advertisers permit post-roll placement of the advertisements. In another example, advertisements may be selected or excluded by other information in the ad request, such as whether a viewer of the video has capability of skipping ads, whether the video is an embedded video, or whether the video is presented by websites identified by the advertiser.

At least one advertisement is transmitted (512). In some implementations, the advertisement(s) are transmitted from the publisher at the request of the ad server. In some other implementations, the video advertisement(s) are transmitted by the ad server. The advertisement(s) is received by the client (514). The received advertisements) is placed in the advertisement slot within the video and when playback of the video reaches the advertisement slot, the advertisement(s) is presented (518). This may be accomplished using the technology, for example, described in U.S. patent application Ser. No. 11/550,388, for "Using Viewing Signals In Targeted Video Advertising," which is incorporated by reference in its entirety. In one example, the advertisements may be presented in one or both of the content regions 304A and 304B of FIG. 3.

It should be appreciated that it may be possible that no advertisement is transmitted for an advertisement slot. For example, the ad server may determine that no advertiser provided an advertisement for placement with the video. In another example, the ad server may determine that the ad request does not satisfy any placement prefer of advertisements. When playback of the video reaches the advertisement slot, the advertisement slot may be bypassed, and playback continues from the next portion of the video.

As described above, a video may have one or more advertisement slots. An advertisement slot is a span of time in a video that is reserved for presenting advertisements. In some implementations, an advertisement slot is akin to the well-known commercial break within or between television programs. An advertisement slot may be located anywhere in the video, including at the beginning (before the feature content of the video), in between portions of the video, or at the end. A video may have one or more advertisement slots. An advertisement slot may be of any non-zero length. In an example implementation, the length of an advertisement slot is thirty (30) seconds. In another example implementation, the length of an advertisement slot is sixty (60) seconds. Furthermore, in some implementations, the advertisement slot has a maximum length and the total running time of the one or more advertisements placed in a particular slot may be less than or equal to the maximum length of that slot.

In some implementations, one or more advertisement slots are added to a video by the creator of the video. That is, the creator of the video indicates the positions and lengths of the advertisement slots as part of the process of creating the video or as a subsequent modification to the video. In some other implementations, positions of advertisement slots are determined by automated processes.

Figure 6:
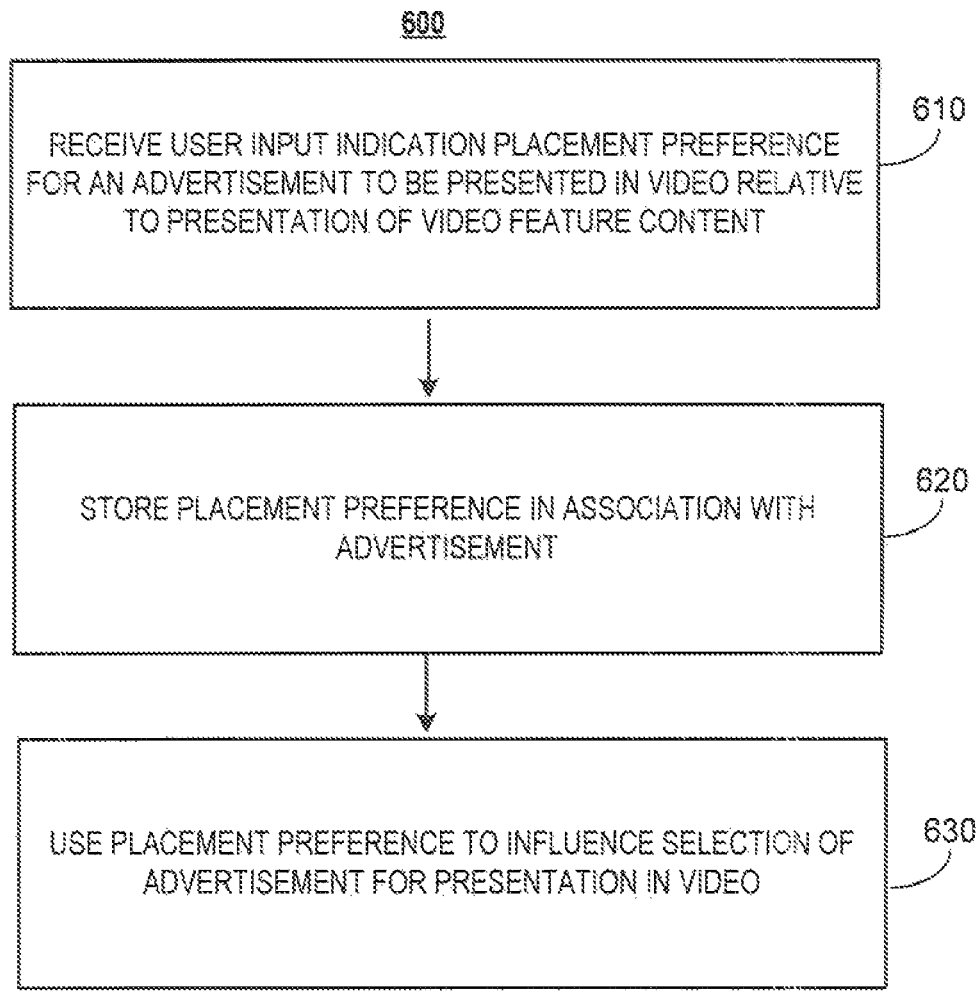
FIGS. 6 and 8 are example flow diagrams for using placement preference in selecting advertisements.

FIG. 6 is an example flow diagram of a process 600 for indicating a placement preference for use in selecting advertisements. The process 600 may be executed, for example, by the advertisement provider system 103 of FIGS. 1 and 2.

The process 600 begins when a user input indicating a placement preference is received (610). More particularly, the user input indicates placement preference for an advertisement to be presented in video relative to presentation of video feature content. The user may be an advertiser who wants to specify placement preference for art advertisement. The placement preference may indicate, for example, the temporal position of the advertisement relative to video feature content (e.g., pre-roll placement, mid-roll placement and post-roll placement). Additionally or alternatively, the placement preference may indicate whether the advertisement may be presented in video content where the viewer may skip the advertisement.

In some implementations, an advertiser may use a graphical user interface to enter or modify a placement preference (or preferences). One example of such a user interface is the user interface 700 described below with respect to FIG. 7.

In some implementations, receiving user input may include receiving a bid from an advertiser for placement of an advertisement that reflect placement preference of a sponsor of the advertisement. For example, a bid may be received for an advertisement based on a pre-roll placement, and another bid may be received for the same advertisement based on a post-roll placement.

The received placement preference is stored in association with an advertisement (620). For example, the placement preference is stored in the advertising repository 103 of FIG. 1. The stored placement preference is then used to influence the selection of advertisements for presentation in video (630). In some implementations, the stored placement preference may be used to select an advertisement in response to a request for advertisements from a client as described previously with respect to FIG. 5. For example, if the request from a client allows a pre-roll placement, advertisements having placement preference for the pre-roll placement may be selected. Alternatively or additionally, if the request is from a client which allows a viewer to skip advertisements, advertisements having placement preference against the skipping feature may be excluded.

Selecting advertisements for presentation during a video broadcast or in a video stream may be accomplished using the technology, for example, described in U.S. patent application Ser. No. 11/550,249, for "Targeted Video Advertising," which is incorporated by reference in its entirety.

Figure 7:
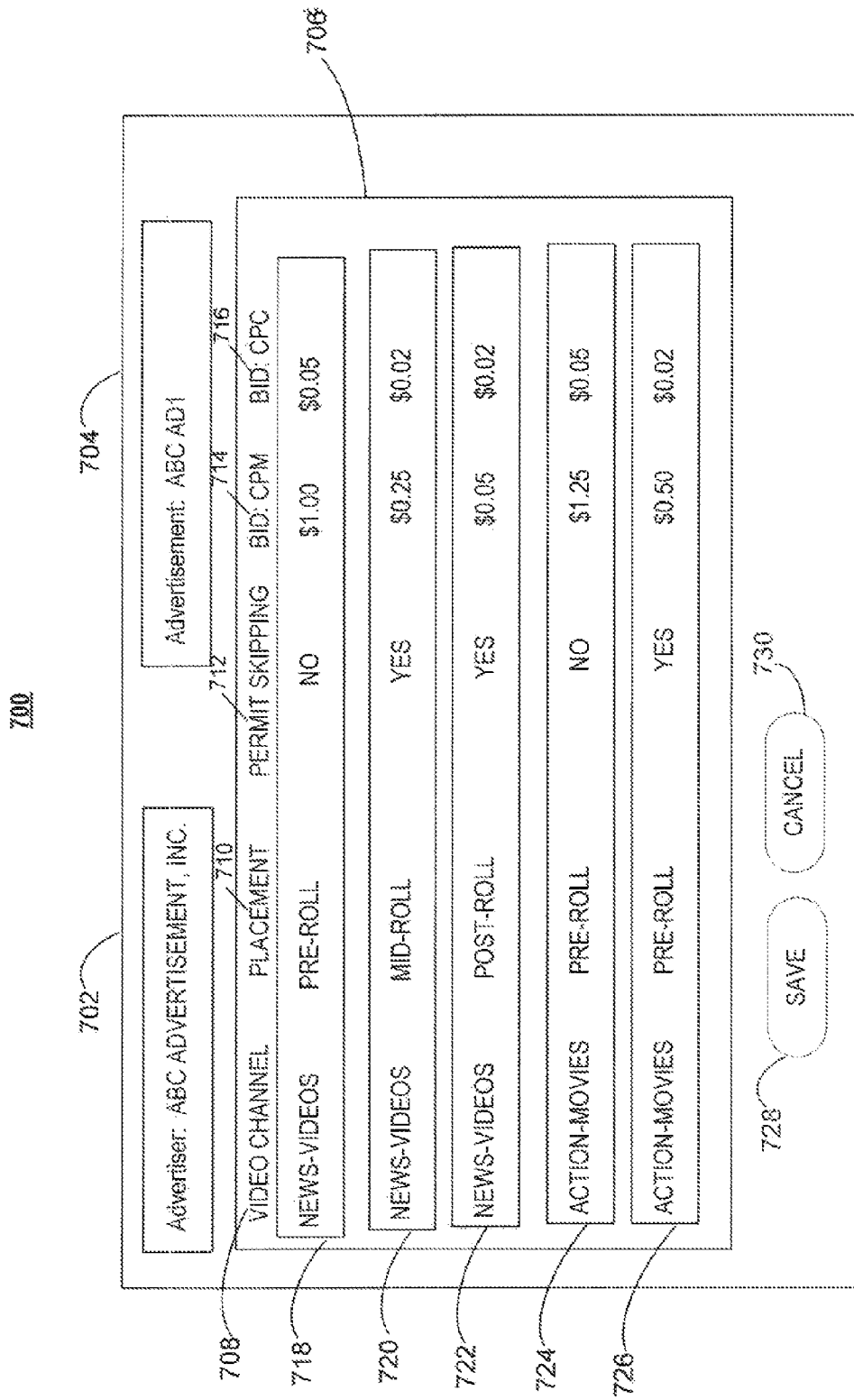
FIG. 7 is an example user interface for entering bids for placement relative to feature content.

FIG. 7 is an example user interface 700 for entering bids for advertisement placement relative to feature content. Placement of advertisement(s) during the video playback may be accomplished using the technology, for example, described in U.S. Patent Application No. 60/915,654, for "User Interfaces for Web-Based Video Player," which is incorporated by reference in its entirety. In this example, the selection of advertisements for placement in a video content item is determined based on a placement preference and a bid of an advertiser. For example, among the advertisements having a matching placement preference with a video content item, the advertisement(s) with the highest bid may be presented in the video feature content as specified by the placement preference.

Auctions for particular placement of advertisements may be accomplished using the technology, for example, described in U.S. patent application Ser. No. 11/479,942, for "Slot Preference Auction," which is incorporated by reference in its entirety.

The user interface 700 may be used, for example, during the process 600 of FIG. 6. The user interface 700 may be provided by ad server 206 to an advertiser, so that the advertiser may specify placement preference.

As shown, the user interface 700 includes an advertiser region 702, an advertisement region 704 and a placement preference region 706. The placement preference region 706 includes placement preferences 718, 720, 722, 724 and 726. Each of the placement preferences 718, 720, 722, 724 and 726 specifies factors to be considered in selecting advertisements to be presented in video content. In this example, each of the placement preferences 718, 720, 722, 724 and 726 may specify five factors or columns, "Video Channel" column 708, "Placement" column 710, "Permit Skipping" column 712, "BID: CPM" 714 and "BID: CPC" 716. The user interface 700 also includes "save" button 728 and "cancel" 730 button.

The advertiser region 702 identifies the advertiser, for example, "ABC Advertisement, Inc." The ad server 206 may associate the advertiser specified in the advertiser region 702 with information for the advertiser (e.g., an email address, a password, billing information, etc.). The advertisement region 704 specifies one or more advertisements of the advertiser to which the placement preferences of the placement preference region 706 are to be applied. In this example, single advertisement "ABC AD1" is specified in the advertisement region 704. In some implementations, more than one advertisements may also be specified for which the placement preferences 718, 720, 722, 724 and 720 are to be applied.

Each of the placement preferences 718, 720, 722, 724 and 726 specifies each of live factors 708, 710, 712, 714 and 716 to be used to select advertisements to be presented in video content. The "Video Channel" 708 indicates the type of video content in which the advertisement specified in the advertisement region 704 may be presented, such as "News-Videos" and "Action-Movies," The "Placement" 710 indicates the temporal position in video content where the advertisement should be placed, such as pre-roll mid-roll and post-roll placements. The "Permit Skipping" 712 indicates whether the advertisement may be presented in video content where a viewer may skip advertisements. The "BID: CPM" 714 specifies a bid based on Cost-Per-Mille (CPM). The "BID: CPC" 716 specifies a bid based on Cost-Per-Click (CPC).

In the placement preference 718, the "Video Channel" column 708, "Placement" column 710, "Permit Skipping" column 712, "BID: CPM" 714 and "BID: CPC" 716 are respectively specified as "News-Videos," "Pre-Roll," "No," $1.00 and $0.05. Thus, the placement preference 718 specifies that the advertisement "ABC AD1" should be presented in news-videos ("News-Videos") before the video feature plays ("Pre-Roll") where a viewer cannot skip advertisements ("No" for "Permit Skipping"). For such a presentation of "ABC AD1", the advertiser "ABC Advertisement Inc." offered a bid of $1.00 based on CPM and a bid of $0.05 based on CPC.

In the placement preference 720, the five factors or columns 708, 710, 712, 714 and 716 are respectively specified as "News-Videos," "Mid-Roll," "Yes," $0.25 and $0.02. Thus, the placement preference 720 specifies that the advertisement "ABC AD1" should be presented in news-videos ("News-Videos") while the video feature has begun or is playing ("Mid-Roll") regardless of whether a viewer may skip advertisements ("Yes" for "Permit Skipping"). For such a presentation of "ABC AD1", the advertiser "ABC Advertisement, Inc." offered a bid of $0.25 based on CPM and a bid of $0.02 based on CPC.

In the placement preference 722, the five factors or columns 708, 710, 712, 714 and 716 are respectively specified as "News-Videos," "Post-Roll," "Yes," $0.05 and $0.02, Thus, the placement preference 722 specifies that the advertisement "ABC AD1" should be presented in news-videos ("News-Videos") after the video feature has finished playing ("Post-Roll") regardless of whether a viewer may skip advertisements ("Yes" for "Permit Skipping"). For such a presentation of "ABC AD1", the advertises "ABC Advertisement, Inc." offered a bid of $0.05 based on CPM and a bid of $0.02 based on CPC.

In the placement preference 724, the five factors or columns 708, 710, 712, 714 and 716 are respectively specified as "Action-Movies," "Pre-Roll," "No," $1.25 and $0.05. Thus, the placement preference 724 specifies that the advertisement "ABC AD1" should be presented in action movies ("Action-Movies") before the video feature plays ("Pre-Roll") where a viewer cannot skip advertisements ("No" for "Permit Skipping"). For such a presentation of "ABC AD1", the advertiser "ABC Advertisement, Inc." offered a bid of $1.25 based on CPM and a bid of $0.05 based on CPC.

In the placement preference 726, the five factors or columns 708, 710, 712, 714 and 716 are respectively specified as "Action-Movies," "Pre-Roll," "Yes," $0.50 and $0.02. Thus, the placement preference 726 specifies that the advertisement "ABC AD1" should be presented in action movies ("Action-Movies") before the video feature plays ("Pre-Roll") regardless of whether a viewer may skip advertisements ("Yes" for "Permit Skipping"). For such a presentation of "ABC AD1", the advertiser "ABC Advertisement, Inc." offered a bid of $0.50 based on CPM and a bid of $0.02 based on CPC.

The advertiser may modify regions 702, 704 and 706 to modify selection of a media stream or file in which one or more advertisements are to be presented. For example, the advertiser may add or delete advertisements in the advertisement region 704, thereby determining which advertisements are influenced by the settings of the placement preference region 706. The advertiser may also modify items in the placement preference region to influence selection of a media stream or files. The advertiser may cancel the modification of the settings of the user interface 700 by using the cancel button 730. The advertiser may also store and initiate the modification to take effect by using the save button 728.

Figure 8:
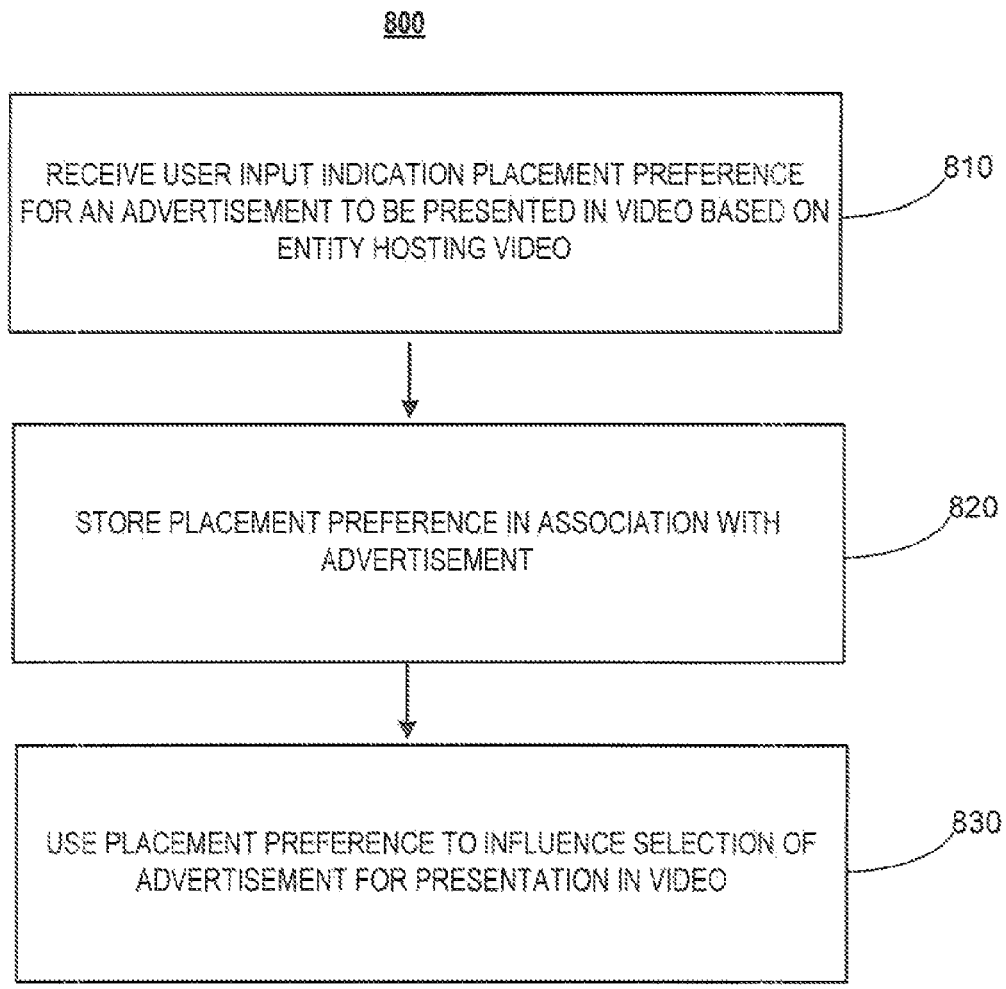

FIG. 8 is an example flow diagram of a process 800 for indicating a placement preference for use in selecting advertisements. The process 800 may be executed, for example, by the advertisement provider 102 of FIGS. 1 and 2.

The process begins when a user input indicating a placement preference is received (810). More particularly, the user input indicates placement preference for an advertisement to be presented in video based on entity presenting the video. The user may be an advertiser who wants to specify placement preference for an advertisement. The placement preference may indicate, for example, whether the advertisement may be presented in an embedded content. Additionally or alternatively, the placement preference may include a list of entities. The placement preference may indicate that the advertisements should not be presented in video contents presented by those entities in the list.

In some implementations, an advertiser may use a graphical user interface to enter or modify a placement preference (preferences). One example of such a user interface is the user interface 900 described below with respect to FIG. 9. In some implementations, receiving user input may include receiving a bid front an advertiser for placement of an advertisement that reflect placement preference of a sponsor of the advertisement. For example, a bid may be received for an advertisement indicating that the advertisement should be not presented in an embedded content.

The received placement preference is stored in association with an advertisement (820). For example, the placement preference is stored in the advertising repository 103 of FIG. 1. The stored placement preference is then used to influence the selection of advertisements for presentation in video (830). In some implementations, the stored placement preference may be used to reject a request for advertisement for an embedded content. For example, upon receiving a request for advertisement, an ad server may determine the incoming request's domain and compare the domain with the domain of the content owner. If both domains are different or if the incoming request's domain can not be determined, the ad server may determine that the request for advertisement is for an embedded content. Then, advertisements with placement preference that prohibit presentation in an embedded content will not be selected by the ad server for presentation in the content. Alternatively or additionally, the stored placement preference may be used to reject a request for advertisement from certain entities. For example, upon receiving a request for advertisement, an ad server may determine the incoming request's domain and determine whether the domain is included in the list of entities indicated by the stored placement preference for an advertisement. If the list includes the incoming request's domain, then the ad server should not select the advertisement for presentation in the content.

In some implementations, the selected advertisements may be presented in a media stream or file, other than a video stream or file. For example, the media stream or file may be an audio stream or file, or a combination of video and audio streams or files.

Figure 9:
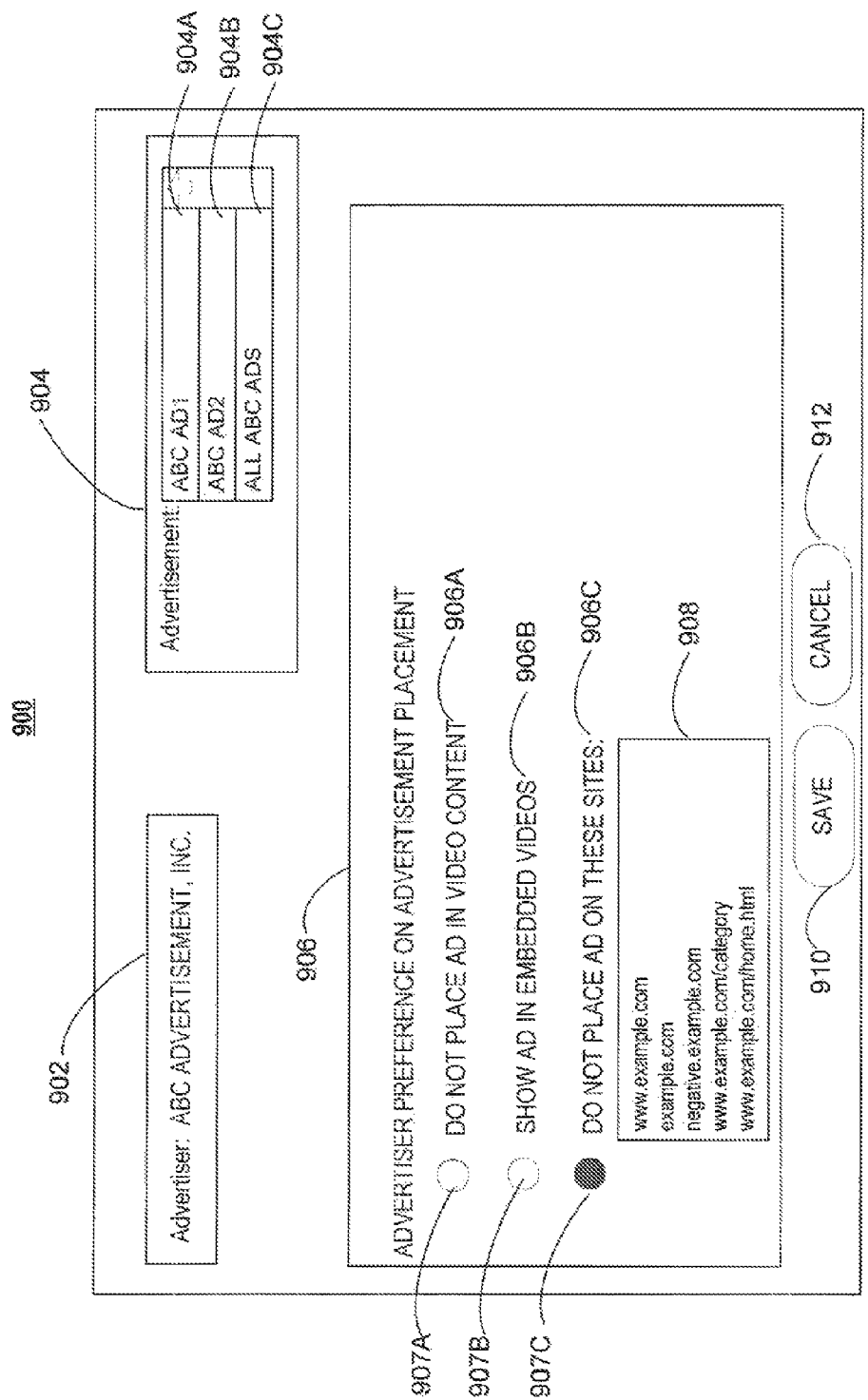
FIG. 9 is an example user interface for excluding placement of advertisements in video based on presenting entity.

FIG. 9 is an example user interface 900 for excluding placement of advertisements in video based on video presenting entity. The user interface 900 may be used, for example, during the process 800 of FIG. 8 The user interface 900 may be provided by ad server 206 to an advertiser, so that the advertiser may specify placement preference.

As shown, the user interface 900 includes an advertiser region 902, an advertisement region 904 and an advertiser preference region 906. The placement preference region 906 includes advertiser preferences 906A, 906B and 906C and a website list region 908. The user interface 900 also includes "save" button 910 and "cancel" 912 button.

The advertiser region 902 specifies the advertiser, for example, "ABC Advertisement, Inc." The ad server 206 may associate the advertiser specified in the advertiser region 902 with information for the advertiser (e.g., a unique email address, a password, billing information, etc.). The advertisement region 904 specifies one or more advertisements of the advertiser to which the advertiser preferences of the advertiser preference region 906 will be applied. In this example, the advertiser may select one or more advertisements among "ABC AD1" 904A and "ABC AD2" 904B or may select all the advertisements of "ABC Advertisement, Inc. by selecting "All ABC Ads" 904C.

Each of the advertiser preferences 906A, 906B and 906C specifies specific placement preference that will influence selection of a media stream or file in which the advertisements specified in the advertisement region 904 are to be presented. For example, the advertisement preference "Do Not Place AD in Video Content" 906A specifies whether the advertisements may be placed in video content. In the example, the advertisement preference 906A is not activated, as illustrated by the radio button 907A near the advertisement preference 906A. Thus, the advertisements may be placed in video content. The advertiser may prohibit the placement of the advertisement in video content by activating the radio button 907A for the advertisement preference 906A.

The advertiser preference "Show AD in Embedded Videos" 906B specifies whether the advertisements may be shown in embedded videos. In the example, the advertisement preference 906B is not activated, as illustrated by the radio button 907B near the advertisement preference 906B. Thus, the advertisements may be shown in embedded videos. The advertiser may prohibit the placement of the advertisement in embedded videos by activating the radio button 907B for the advertisement preference 906B.

The advertiser preference "Do Not Place AD on These Sites:" 906C dictates that the advertisements should not be shown in videos presented by the websites specified in the website list region 908. In the example, the advertisement preference 906C is activated, as illustrated by the radio button 907C near the advertisement preference 906C. Thus, the advertisements should not be shown in videos presented by any of the websites specified in the web site list regions 908. As illustrated, www.example.com, example.com, negative-.example.com, www.example.com/category, and www.example.com/home.html are excluded.

The advertiser may activate one or more advertiser preferences 906A, 906B or 906C to influence selection of media streams or files in which the advertisements are to be presented. The advertiser may also add or delete websites in the website list region 908 to influence on which websites the advertisements should not be shown. The advertiser may add or delete advertisements in the advertisement region 904, thereby determining which advertisements are influenced by the settings of the advertiser preference region 906.

The advertiser may cancel the modification of the settings of the user interface 900 by using the cancel button 912. The advertiser may also store and initiate the modified settings to take effect by using the save button 910.

Although the above implementations describe targeting advertisements to content items that include video content and presenting such advertisements, the above implementations are applicable to other types of content items and to the targeting of content other than advertisements to content items. For example, is some implementations, a text advertisement, an image advertisement, an audio-only advertisement, or other content, etc. might be presented with a video content item. Thus, although the format of the ad content may match that of the video content item with which it is served, the format of the advertisement need not match that of the video content item. The ad content may be rendered in the same screen position as the video content, or in a different screen position (e.g., adjacent to the video content as illustrated in FIG. 3). A video advertisement may include video components, as well as additional components (e.g., text, audio, etc.). Such additional components may be rendered on the same display as the video components, and/or on some other output means of the user device. Similarly, video ads may be played with non-video content items (e.g., a video advertisement with no audio can be played with an audio-only content item).

In some implementations, the content item can be an audio content item (e.g., music, file, audio podcast, streaming radio, etc.) and advertisements of various formats can be presented with the audio content item. For example, audio-only advertisements can be presented in-stream with the playback of the audio content item. If the audio content item is played in an on-screen audio player module (e.g., a Flash-based audio player module embedded in a webpage), on-screen advertisements can be presented in proximity to the player module. Further, if the player module can display video as well as play back audio, video advertisements can be presented in-stream with the playback of the audio content item.

Further, in some implementations the content that is identified for presentation based on the targeting criteria (advertisements in the implementations described above) need not be advertisements. The identified content can include non-advertisement content items that are relevant to the original content item in some way. For example, for a respective boundary in a video content item, other videos (that are not necessarily advertisements) relevant to the targeting criteria of one or more segments preceding the boundary can be identified. Information (e.g., a sample frame, title, running time, etc.) and the links to the identified videos can be presented in proximity to the video content item as related videos. In these implementations, the related content provider can be considered a second content provider that includes a content analyzer, boundary module, and a targeting criteria module.

The implementations above were described in reference to a client-server system architecture. It should be appreciated, however, that system architectures other than a client-server architecture can be used. For example, the system architecture can be a peer-to-peer architecture.

Figure 10:
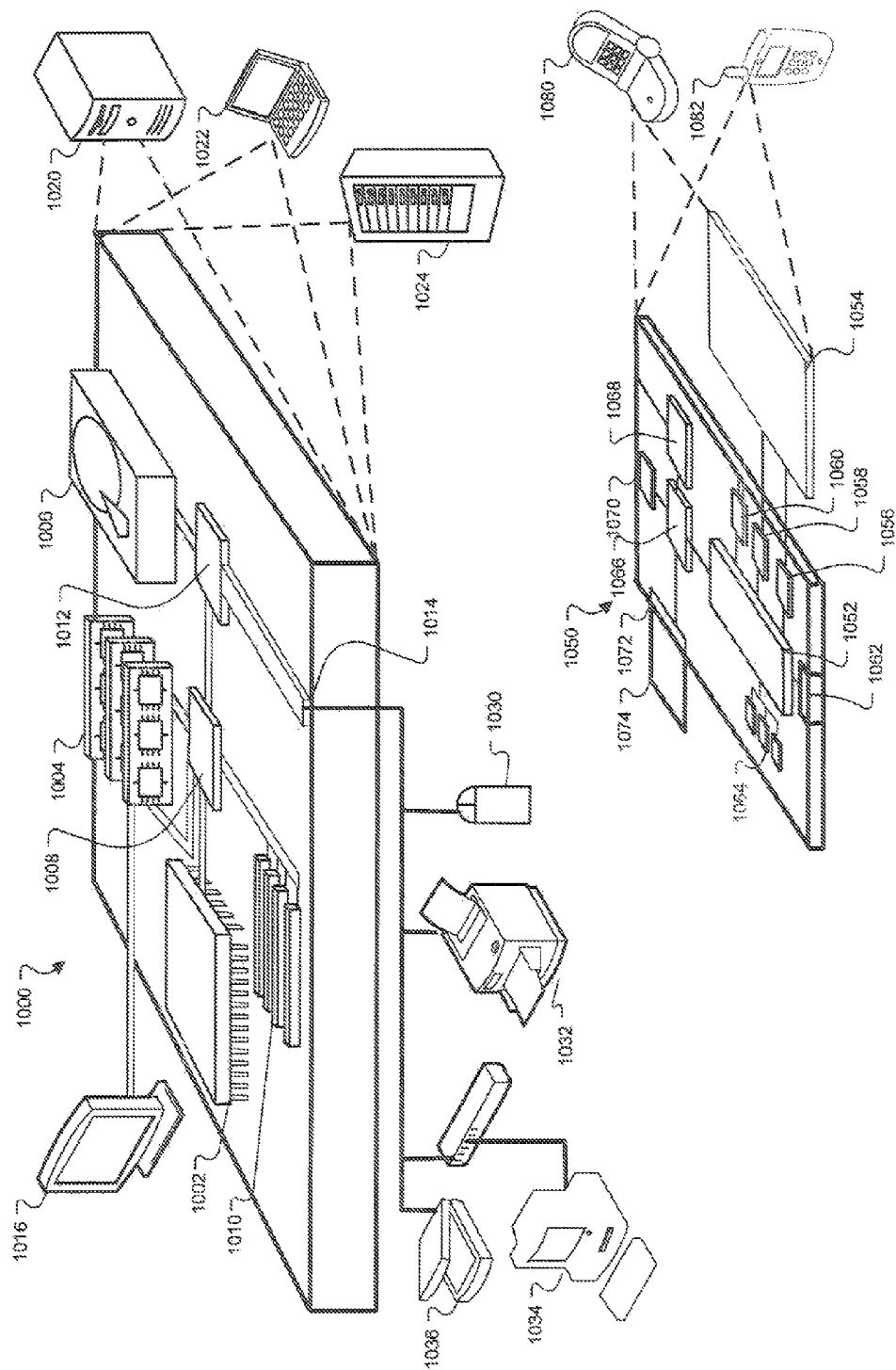
FIG. 10 is a block diagram illustrating an example generic computer and an example generic mobile computer device.

FIG. 10 shows an example of a generic computer device 1000 and a generic mobile computer device 1050, which may be used with the techniques described above. Computing device 1000 is intended to represent various forms of digital computers, such as laptops, desktops, workstations, personal digital assistants, television set-top boxes, servers, blade servers, mainframes, and other appropriate computers. Computing device 1050 is intended to represent various forms of mobile devices, such as personal digital assistants, cellular telephones, smartphones, and other similar computing devises. The components shown here, their connections and relationships, and their functions, are meant to be exemplary only, and are not meant to limit the implementations described and/or the claims.

Computing device 1000 includes a processor 1002, memory 1004, a storage device 1006, a high-speed interface 1008 connecting to memory 1004 and high-speed expansion ports 1010, and a low speed interface 1012 correcting to low speed bus 1014 and storage device 1006. Each of the components 1002, 1004, 1006, 1008, 1010, and 1012, are interconnected using various buses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, memory on processor 1002, or a propagated signal.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard 1034, a pointing device 1030, a scanner 1036, a printer 1032 or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (no: shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT (Thin-Film-Transistor Liquid Crystal Display) display or an OLED (Organic Light Emitting Diode) display, or other appropriate display technology. The display interlace 1056 may comprise appropriate circuitry for driving the display 1054 to present graphical and other initiation to a user. The control interface 1058 may receive commands from a user and convert them for submission to the processor 1052. In addition, an external interface 1062 may be provide in communication with processor 1052, so as to enable near area communication of device 1050 with other devices. External interlace 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provide as a security module for device 1050, and may be programmed with instructions that permit secure use of device 1050. In addition, secure applications may be provided via the SIMM cards, along with additional information, such as placing identifying information on the SIMM card in a non-hackable manner.

Use memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, memory on processor 1052, or a propagated signal that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, WiFi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also knows as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory. Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, of tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made. For example, various forms of the flows shown above may be used, with steps re-ordered, added, or removed. Other implementations are within the scope of the following claims.

What is claimed is:

1. A computer-implemented method comprising:
receiving, from a first advertiser and by at least one processor, input indicating that a first advertisement is eligible to be presented to user devices that have a capability to selectively skip presentation of the first advertisement;
receiving, from a second advertiser and by at least one processor, input indicating that a second advertisement is eligible to be presented only to user devices that do not have the capability to selectively skip presentation of the second advertisement;
receiving a request for an advertisement to be provided to a user device with a video;
determining, by at least one processor, that the user device has the capability to selectively skip presentation of advertisements that are provided with the video; and
selecting, by at least one processor and from among at least the first advertisement and the second advertisement, an advertisement to be provided with the video, the selection being based on the determination that the user device has the capability to selectively skip presentation of advertisements, and based on the eligibility of advertisements to be presented to user devices that have the capability to selectively skip presentation of the selected advertisement, as specified by at least the input from the first advertiser and the input from the second advertiser.

2. The method of claim 1, wherein the advertisements comprise one or more of text, graphics, still-image, video, audio, banners or links.

3. The method of claim 1, wherein receiving the input comprises receiving an advertiser presentation preference specifying one or more of pre-roll placement requesting that presentation of the advertisement occur prior to presentation of feature content of the video, mid-roll placement requesting that presentation of the advertisement occur between a beginning and an end of the feature content of the video, or post-roll placement requesting that presentation of the advertisement after presentation of feature content of the video has completed.

4. The method of claim 1, further comprising:

receiving, for one advertisement and from an advertiser, a first bid for distributing the one advertisement to a media player that provides a user the capability to selectively skip advertisements; and receiving, for the one advertisement and from the advertiser, a second bid for distributing the one advertisement to a media player that does not provide a user the capability to skip advertisements, wherein:

the second bid is different from the first bid; and selecting an advertisement comprises selecting the one advertisement to be provided to a user based on one of the first bid or the second bid, the one advertisement being selected to be provided based on the first bid when it is determined, based on the advertisement request, that the media player at the user device provides a user the capability to skip advertisements that are received with the video, the one advertisement being selected to be provided based on the second bid when it is determined, based on the advertisement request, that the media player at the user device does not provide a user the capability to skip advertisements that are received with the video.

5. The method of claim 1, comprising:

receiving input that conditions selection of the at least one of the first or second advertisements based on an identity of an entity that is providing the video.

6. The method of claim 5, comprising:

receiving input specifying whether at least one of the first or second advertisements is eligible to be provided in response to an advertisement request that requests an advertisement to be presented with an embedded video, where an entity providing the embedded video in response to the request is different from an entity owning the embedded video, wherein:

selecting an advertisement comprises selecting the advertisement based, in part, on whether the selected advertisement will be presented with an embedded video.

7. The method of claim 5, comprising:

receiving input identifying one or more entity identities, and specifying whether at least one of the first or second advertisements is eligible for presentation with a video provided by the one or more entities in response to requests for the video, wherein:

selecting an advertisement comprises selecting the advertisement based, in part, on whether the selected advertisement will be presented with a video provided by the one or more entities.

8. The method of claim 1, wherein:

receiving the input comprises receiving input specifying that at least one of the first or second advertisements is precluded from presentation with videos provided by at least one entity; and selecting an advertisement comprises selecting an advertisement, in part, based on whether the selected advertisement will be provided with a video provided by the at least one entity.

9. The method of claim 8, wherein the at least one entity is specified by a uniform resource locator.

10. A computing device comprising a computer program stored on a computer readable medium, the stored computer program including executable instructions causing the computing device to perform operations comprising:

receiving, from a first advertiser, input indicating that a first advertisement is eligible to be presented to user devices that have a capability to selectively skip presentation of the first advertisement;

receiving, from a second advertiser, input indicating that a second advertisements is eligible to be presented to user devices that have a capability to selectively skip presentation of the second advertisement;

receiving a request for an advertisement to be provided to a user device with a video;

determining that the user device has the capability to selectively skip advertisements that are provided with the video; and selecting, from among the first advertisement and the second advertisement, an advertisement to be provided with the video, the selection being based on the determination that the user device has the capability to selectively skip presentation of advertisements, and based on the eligibility of advertisements to be presented to user devices that have the capability to selectively skip presentation of selected advertisements, as specified by at least the input from the first advertiser and the input from the second advertiser.

11. The computing device of claim 10, wherein the input includes data specifying one or more of pre-roll placement requesting that presentation of the advertisement occur prior to presentation of feature content of the video, mid-roll placement requesting that presentation of the advertisement occur between a beginning and an end of the feature content of the video, or post-roll placement requesting that presentation of the advertisement after presentation of feature content of the video has completed.

12. The computing device of claim 10, wherein the instructions cause the at least one processor to perform operations comprising: receiving input that conditions selection of at least one of the first or second advertisements based on an identity of an entity that is providing the video.

13. The computing device of claim 12, wherein:

the input for at least one of the first or second advertisements specifies whether the at least one advertisement is eligible to be provided in response to an advertisement request for an advertisement that is to be presented with an embedded video, where an entity providing the embedded is different from an entity owning the embedded video; and selecting an advertisement comprises selecting the advertisement based, in part, on whether the selected advertisement will be presented with an embedded video.

14. The computing device of claim 12, wherein:

the input for at least one of the first or second advertisements specifies one or more entities and whether the at least one advertisement is eligible to be provided in response to a request for an advertisement to be presented with a video presented by the one or more entities; and selecting an advertisement comprises selecting the advertisement based, in part, on whether the selected advertisement will be presented with a video provided by the one or more entities.

15. A system, comprising:

a data store storing a plurality of advertisements;

at least one processor that interacts with the data store and executes instructions that cause the at least one processor to perform operations comprising;

receiving, from a first advertiser, input indicating that a first advertisementis eligible to be presented to user devices that have a capability to selectively skip presentation of the first advertisement;

receiving, from a second advertiser, input indicating that a second advertisements is eligible to be presented to user devices that have a capability to selectively skip presentation of the second advertisement;

receiving a request for an advertisement to be provided to a user device with a video;

determining that the user device has the capability to selectively skip advertisements that are provided with the video; and selecting, from among the first advertisement and the second advertisement, an advertisement to be provided with the video, the selection being based on the determination that the user device has the capability to selectively skip presentation of advertisements, and based on the eligibility of advertisements to be presented to user devices that have the capability to selectively skip presentation of selected advertisements, as specified by at least the input from the first advertiser and the input from the second advertiser.

16. The system of claim 15, wherein the instructions cause the at least one processor to perform operations comprising:

receiving input specifying whether at least one of the first or second advertisements is eligible for presentation in response to an advertisement request based on an identity of an entity providing the video, wherein:

selecting an advertisement comprises selecting an advertisement, at least in part, based on the entity providing the video.

17. The system of claim 16, wherein the input for at least one of the first or second advertisements specify that the at least one advertisement is precluded from presentation with videos provided by at least one entity.

* * * * *

UNITED STATES PATENT AND TRADEMARK OFFICE
CERTIFICATE OF CORRECTION

PATENT NO.      : 8,661,464 B2                                  Page 1 of 1
APPLICATION NO. : 11/770585
DATED           : February 25, 2014
INVENTOR(S)     : Poorva Arankalle et al.

It is certified that error appears in the above-identified patent and that said Letters Patent is hereby corrected as shown below:

In the Claims

Claim 13, Column 26, Line 59 – after "embedded" insert -- video --.

Claim 15, Column 27, Line 14 – delete "advertisementis" and insert -- advertisement is --, therefor.

Signed and Sealed this
Eighth Day of July, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO. : 8,661,464 B2
APPLICATION NO. : 11/770585
DATED : February 25, 2014
INVENTOR(S) : Arankalle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 841 days.

Signed and Sealed this
Thirtieth Day of June, 2015

Michelle K. Lee
*Director of the United States Patent and Trademark Office*